(No Model.) 3 Sheets—Sheet 2.
J. F. SEIBERLING.
HARVESTER.
No. 290,484. Patented Dec. 18, 1883.
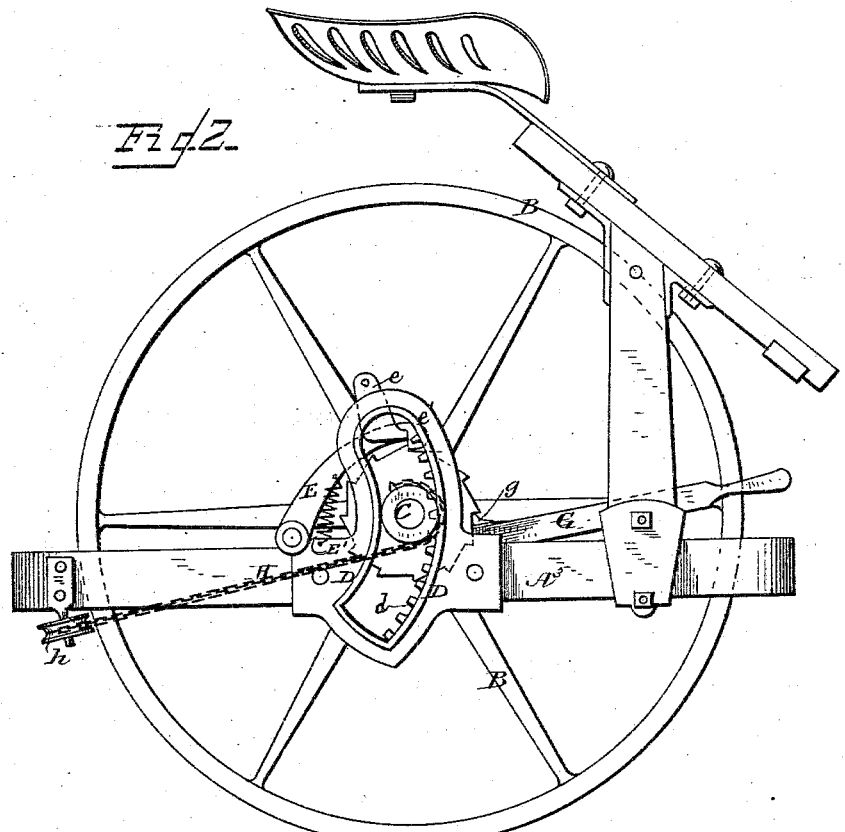
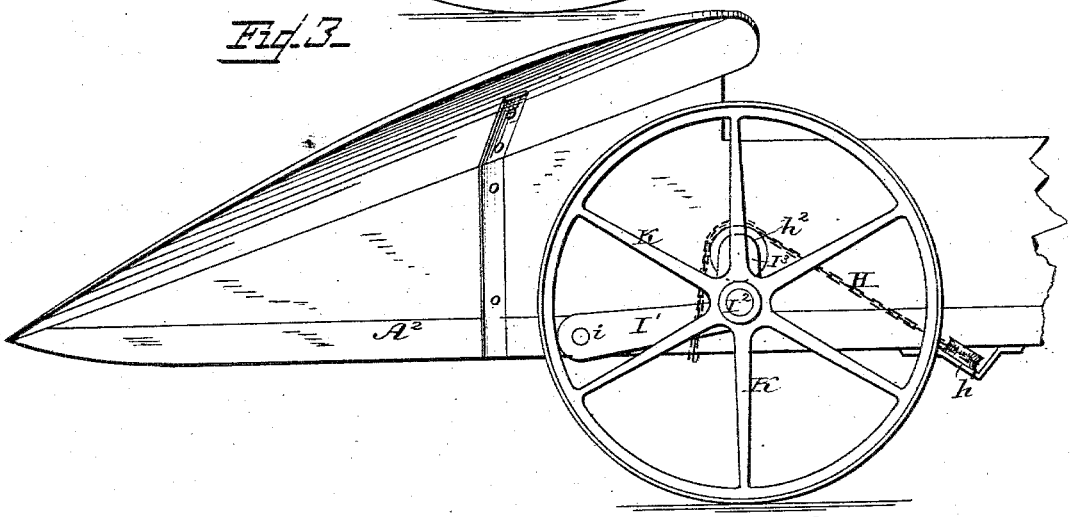
WITNESSES
Franck L. Ourand.
Rex. Smith.
INVENTOR
John F. Seiberling
by A.M. Smith
Attorney (No Model.) 3 Sheets—Sheet 3.

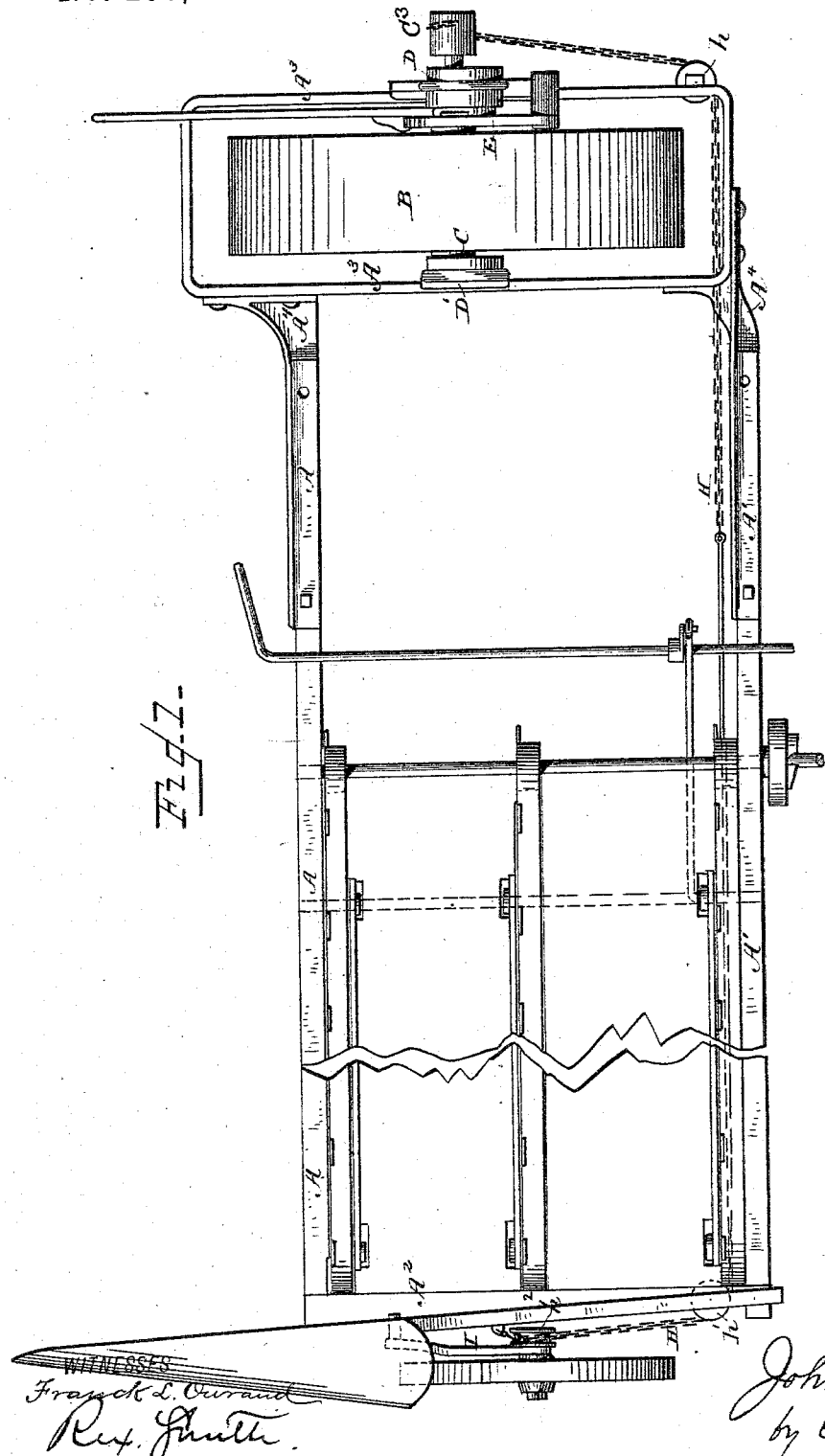

J. F. SEIBERLING.
HARVESTER.

No. 290,484. Patented Dec. 18, 1883.

WITNESSES
Franck L. Ourand
Rex Smith

INVENTOR
John F. Seiberling
by A. H. Smith
Attorney

# UNITED STATES PATENT OFFICE.

JOHN F. SEIBERLING, OF AKRON, OHIO.

HARVESTER.

SPECIFICATION forming part of Letters Patent No. 290,484, dated December 18, 1883.

Application filed July 5, 1883. (No model.)

*To all whom it may concern:*

Be it known that I, JOHN F. SEIBERLING, of Akron, county of Summit, and State of Ohio, have invented a new and useful Improvement in Harvesters, of which the following is a full, clear, and exact description, reference being had to the accompanying drawings, making part of this specification.

My invention relates to a novel means for adjusting the frame and platform of a harvester upon the drive-wheel of the machine, whereby the adjustment of both wheels may be made simultaneously by convenient means arranged upon the stubble side of the machine, and to certain details of construction to facilitate such adjustments.

The improvements consist, primarily, in securing toothed segment-brackets upon opposite sides of the drive-wheel and on an axle upon which the drive-wheel revolves, provided with toothed gears that engage with and are adjusted upon said brackets, and also in securing to the end of said axle a drum upon which one end of a chain is wound, said chain being connected with the grain side of the platform and supported upon pulleys upon the frame, and also upon a pulley on the arm of a pivoted lever to which the grain-wheel axle is attached, said parts being so constructed and arranged that the adjustment of the drive-wheel axle upon its supporting-brackets will effect the adjustment of the grain-wheel upon its frame-support.

The invention further consists in the peculiar construction of the grain-wheel support, and in the manner of connecting the end of the chain with said support and with the grain side of the frame; also, in the peculiar construction of parts for supporting and adjusting the drive-wheel axle—viz., the construction of the lever for revolving the axle, the pawls and ratchets for adjusting and retaining the axle in its adjusted position, and in the combination and arrangement of parts, hereinafter particularly specified.

Figure 4:
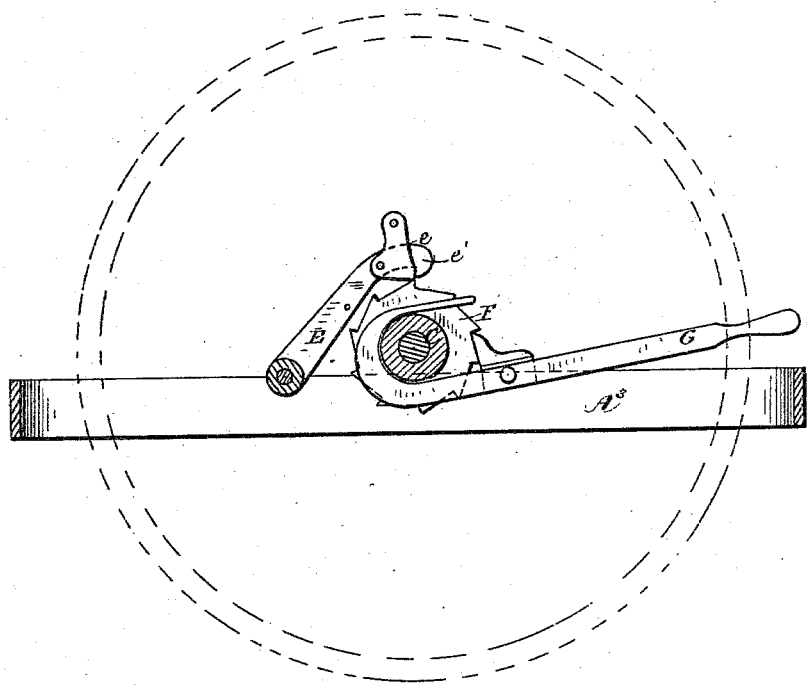
Figure 5:
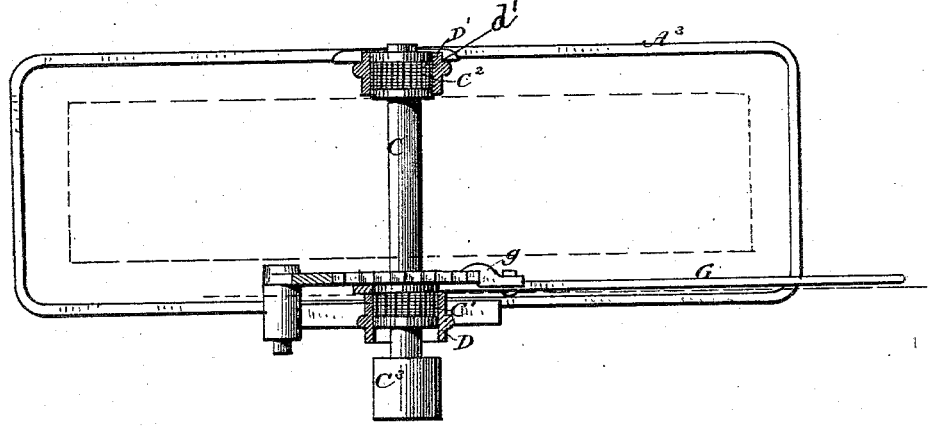

In the accompanying drawings, Figure 1 is a plan view of so much of a harvester-frame as will illustrate my invention, showing the platform broken away; Fig. 2, a side elevation of the drive-wheel and frame from the stubble side of the machine. Fig. 3 is a side elevation of the grain-wheel and frame from the grain side thereof; Fig. 4, a vertical sectional view of the axle, showing the pinions and ratchet-wheels upon the axle and retaining-pawl and hand-lever for adjusting the same; and Fig. 5 is a plan view of the axle, and ratchet-wheel pinions, with the frame-brackets in section.

The frame of the machine may be of any well-known construction, and in this instance consists of the main transverse platform-sills A A', arranged, respectively, at the front and rear sides of the platform, a longitudinal sill, $A^2$, on the grain end, and a rectangular wheel-frame, $A^3$, encircling the wheel on the stubble side of the machine, to which the transverse sills A A' are secured by brackets $A^4$.

The drive-wheel B revolves freely upon the axle C, and is supported within said frame, so that the latter may be adjusted thereon in the following manner: The axle C is provided with gear-pinions C' $C^2$, arranged upon the ends thereof, that intermesh with and roll upon segment-brackets D D', secured to the wheel-frame upon opposite sides of the wheel, and provided with toothed racks d d', upon which the pinions C' $C^2$ are geared, and as the axle, with its gear-wheels, is revolved in one or the other direction it will raise or lower the brackets and the frame secured thereto upon the axle, and may be held in any desired position upon the bracket-rack by means of a pawl, E, secured to the frame or bracket, that engages with a ratchet-wheel, F, secured to the axle. The axle may be revolved, for adjusting it upon the bracket, by means of a hand-lever, G, of peculiar construction, that is fulcrumed upon the axle and engages with the teeth of the ratchet-wheel, as will hereinafter appear. A pulley, $C^3$, is secured to the stubble end of the axle, and a chain, H, secured to the pulley, passes directly to the rear of the frame around a sheave, h, secured to the rear and stubble corner of the wheel-frame. The chain then passes directly to the grain side of the platform, alongside the rear transverse sill, A', and around the sheave h', secured to the rear end of the grain side of the frame, and then passes forward and upwardly over a sheave, $h^2$, upon the end of the upright extension of a lever, I, and is then carried directly and secured to the grain-end sill A² of the platform. The longer arm, I', of an L-shaped lever, I, is pivoted at its front end to the grain-sill of the frame. The stud-axle I² is secured to the lever I at or near its elbow or rear end, upon which the grain-wheel K freely revolves. The short arm I³ extends vertically from the axle I², and carries a sheave, h², upon its upper end, and as the end of the chain H, above referred to, is secured to the platform-frame below the sheave h² and in rear of the pivot i, upon which the arm I swings, it will readily be perceived that when the end of the chain is wound upon the axle, drum, or pulley C³, at the stubble side of the frame, the grain end of the frame will be raised, and when the chain is unwound from the pulley at the end of the drive-axle that the grain end of the frame will be lowered upon the grain-wheel. It will also be seen that the chain is wound upon the pulley C³ of the axle in such manner that as the gear-wheels of the axle are rolled upon the bracket to raise or lower the stubble end of the frame, the chain will be wound or unwound to raise or lower the grain end of the frame, and thus simultaneously raise or lower both ends of the frame.

The pawl E, pivoted to the frame-bracket, has a small bearing plate or lever, e, pivoted to the end thereof, in close relation to and arranged opposite to the jaw e' of the pawl in such manner that when the lever e is operated upon the bearing-surface of the lever will be held down to press against the teeth of the ratchet-wheel and lift the jaw e' of the pawl out of gear with the ratchet-wheel and prevent the said jaw from engaging with the ratchet-wheel so long as the bearing-plate e is pressed down. The pawl E is pressed down, to firmly engage with the teeth of the ratchet-wheel, by the spring E', connected at one end to the pawl and at its other end to the bracket D, to insure their prompt engagement with each other. The hand-lever G is crooked at one end, to span one-half of the circumference of the axle and allow it to be applied to or readily detached therefrom. A spur, g, is secured to the lever to engage with the ratchet-wheel, and thus provide means for revolving the axle. The crook upon the end of the lever will admit of the endwise movement of the lever, whereby the spur g may either be pressed against the ratchet-teeth to engage with them or withdrawn from engagement with the ratchet-teeth to permit the lever to be oscillated either to take a fresh hold upon the teeth or to be entirely disengaged therefrom. The lever may, when not in use, be disengaged from the ratchet-teeth and supported between the axle and front end of the wheel-frame within reach from the driver's seat. Both ends of the frame are thus made adjustable by simple means that may be operated by the driver without leaving his seat.

Various changes may be made in my invention without departing therefrom, and some of the devices employed may be used without the others or in connection with equivalent devices.

Having now described my invention, what I claim as new is—

1. The frame provided with toothed brackets, the drive-wheel axle provided with gear-pinions engaging with said toothed brackets, and a chain-pulley mounted upon said drive-wheel axle, in combination with a chain secured at one end to and adapted to be wound upon said chain-pulley, and at its other end secured to the grain end of the frame, and passing over a sheave on the grain-wheel-carrying bracket, all for the purpose and substantially as described.

2. The combination of the frame, the grain-wheel, the stud-axle bracket, the sheave on the bracket, the sheaves upon both the grain and stubble sides of the rear end of the platform and rear of the wheels, and the drive-wheel axle adjustable upon the frame, and provided with a pulley upon the end of the axle, and the chain passing over said sheave and connecting the pulley of the drive-wheel axle with the grain side of the frame, substantially as described.

3. The combination of the frame, the brackets secured thereto and formed with toothed segment-racks, the drive-wheel axle and gear-pinions, supported and adjusted upon said brackets, the ratchet-wheel secured to the drive-wheel axle intermediately and independent of the gear-pinions, the pawl engaging with the teeth of said ratchet-wheel for retaining it in its adjusted position, and the pivoted rocking lever provided with the pivoted pawl for engaging the ratchet-wheel, all for the purpose and substantially as described.

4. The combination of the frame, the adjustable drive-wheel axle, the ratchet-wheel secured thereto, the retaining-pawl, the bearing-plate pivoted to the pawl, and provided with an arm for operating the same, and the lever for operating the ratchet-wheel, substantially as and for the purpose set forth.

5. The combination of the frame of the drive-wheel, the axle upon which the drive-wheel revolves, the cogged gears secured to the axle, the toothed segment-brackets secured to the frame upon which the axle and its gears are adjusted, the ratchet-wheel, pawl, and hand-lever for adjusting said axle, and a pulley on the axle connected by a chain with the grain-wheel and grain end of the frame, substantially as and for the purpose described.

In testimony whereof I have hereunto set my hand this 22d day of June, A. D. 1883.

JOHN F. SEIBERLING.

Witnesses:
  REX. SMITH,
  EDW. W. DE KNIGHT.